United States Patent
Sugaya (10) Patent No.: US 10,430,925 B2
(45) Date of Patent: Oct. 1, 2019

(54) SYSTEM, METHOD, AND PROGRAM FOR SYNTHESIZING PANORAMIC IMAGE

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/544,089

(22) PCT Filed: Aug. 15, 2016

(86) PCT No.: PCT/JP2016/073855
§ 371 (c)(1),
(2) Date: Jul. 17, 2017

(87) PCT Pub. No.: WO2018/033952
PCT Pub. Date: Feb. 22, 2018

(65) Prior Publication Data
US 2019/0180413 A1   Jun. 13, 2019

(51) Int. Cl.
*G06T 3/00* (2006.01)
*G06T 3/40* (2006.01)
*H04N 7/18* (2006.01)
*H04N 5/232* (2006.01)

(52) U.S. Cl.
CPC .............. *G06T 3/4038* (2013.01); *G06T 3/00* (2013.01); *H04N 5/23238* (2013.01); *H04N 7/18* (2013.01); *H04N 7/181* (2013.01)

(58) Field of Classification Search
CPC ..................................... G06T 3/00; H04N 1/00

USPC ......................................................... 382/284
See application file for complete search history.

(56) References Cited

U.S. PATENT DOCUMENTS

| 6,549,681 | B1 * | 4/2003 | Takiguchi | G06T 3/4038 358/450 |
| 8,848,032 | B2 * | 9/2014 | Yamaji | H04N 5/23238 348/36 |
| 2001/0019363 | A1 * | 9/2001 | Katta | H04N 5/232 348/333.01 |

(Continued)

FOREIGN PATENT DOCUMENTS

| JP | 2001-320616 | 11/2001 |
| JP | 2008-254710 | 10/2008 |

(Continued)

*Primary Examiner* — Abolfazl Tabatabai
(74) *Attorney, Agent, or Firm* — Lex IP Meister, PLLC (57) ABSTRACT

The present invention is to provide a system, a method, and a program for synthesizing a panoramic image that improve the image analysis accuracy. The system for synthesizing a panoramic image 1 combines images taken by a plurality of cameras 200 and produces a panoramic image; analyzes an object contained in the synthesized panoramic image; and displays the result of the image analysis. The system also analyzes an object contained in a seam in the synthesized panoramic image. Furthermore, the system associates and displays the result of the image analysis with the object. Still furthermore, the system supplements a part lacked from the object based on the result of the image analysis. Yet still furthermore, the system produces a panoramic image adjusted to the image that has the most or least pixels among those taken by the plurality of cameras.

7 Claims, 11 Drawing Sheets

(56) References Cited

U.S. PATENT DOCUMENTS

2012/0194636 A1* 8/2012 Tokunaga ............ H04N 1/3876
348/36

FOREIGN PATENT DOCUMENTS

| JP | 2012-160904 | 8/2012 |
| JP | 2014-155168 | 8/2014 |

* cited by examiner

SYSTEM, METHOD, AND PROGRAM FOR SYNTHESIZING PANORAMIC IMAGE

TECHNICAL FIELD

The present invention relates to a system, a method, and a program for synthesizing a panoramic image to produce a panoramic image.

BACKGROUND ART

In recent years, there have been systems that produce a panoramic image by combining images that two or more camera units provided in an imaging device took. Such systems combine the images taken by camera units based on the locations of the camera units to produce a panoramic image. However, such systems are expensive.

On the other hand, there have been systems that produce a panoramic image by combining images that two or more imaging devices took. In such systems, a composition that produces a panoramic image by synthesizing an image based on the images that two or more imaging devices took and the image locations where the imaging devices took is disclosed (see Patent Document 1).

CITATION LIST

Patent Literature

Patent Document 1: JP 2014-155168A

SUMMARY OF INVENTION

However, the composition of Patent Document 1 has a problem in which the analysis accuracy of an image not containing a whole object is less than that containing the whole object because the images taken by the imaging devices are analyzed. Specifically, if there are an image taken by an imaging device that contains a whole object and another image taken by a different imaging device that does not contain the whole object, the analysis accuracy of the latter image is lowered.

An objective of the present invention is to provide a system, a method, and a program for synthesizing a panoramic image that improve the image analysis accuracy by analyzing a panoramic image synthesized from images taken by two or more cameras even if there is an image taken by one camera that does not contain a whole object.

The first aspect of the present invention provides a system for synthesizing a panoramic image, including:

a panoramic image producing unit that combines images taken by a plurality of cameras and produces a panoramic image;

an image analysis unit that analyzes an object contained in the synthesized panoramic image; and an analysis result display unit that displays the result of the image analysis.

According to the first aspect of the present invention, the system for synthesizing a panoramic image combines images taken by a plurality of cameras and produces a panoramic image; analyzes an object contained in the synthesized panoramic image; and displays the result of the image analysis.

The first aspect of the present invention is the category of a system for synthesizing a panoramic image, but the categories of a method and a program for synthesizing a panoramic image have similar functions and effects.

The second aspect of the present invention provides the system according to the first aspect of the present invention, in which the image analysis unit analyzes an object contained in a seam in the synthesized panoramic image.

According to the second aspect of the present invention, the system according to the first aspect of the present invention analyzes an object contained in a seam in the synthesized panoramic image.

The third aspect of the present invention provides the system according to the first aspect of the present invention, in which the analysis result display unit associates and displays the result of the image analysis with the object.

According to the third aspect of the present invention, the system according to the first aspect of the present invention associates and displays the result of the image analysis with the object.

The fourth aspect of the present invention provides the system according to the first aspect of the present invention, further including a supplementary display unit that supplements and displays a part lacked from the object based on the result of the image analysis.

According to the fourth aspect of the present invention, the system according to the first aspect of the present invention supplements and displays a part lacked from the object based on the result of the image analysis.

The fifth aspect of the present invention provides the system according to the first aspect of the present invention, in which the panoramic image producing unit produces a panoramic image adjusted to the image that has the most pixels among those taken by the plurality of cameras.

According to the fifth aspect of the present invention, the system according to the first aspect of the present invention produces a panoramic image adjusted to the image that has the most pixels among those taken by the plurality of cameras.

The sixth aspect of the present invention provides the system according to the first aspect of the present invention, in which the panoramic image producing unit produces a panoramic image adjusted to the image that has the least pixels among those taken by the plurality of cameras.

According to the sixth aspect of the present invention, the system according to the first aspect of the present invention produces a panoramic image adjusted to the image that has the least pixels among those taken by the plurality of cameras.

The seventh aspect of the present invention provides a method for synthesizing a panoramic image, including the steps of;

combining images taken by a plurality of cameras and producing a panoramic image;

analyzing an object contained in the synthesized panoramic image; and displaying the result of the image analysis.

The eighth aspect of the present invention provides a program for causing a system for synthesizing a panoramic image to execute the steps of;

combining images taken by a plurality of cameras and producing a panoramic image;

analyzing an object contained in the synthesized panoramic image; and displaying the result of the image analysis.

The present invention can provide a system, a method, and a program for synthesizing a panoramic image that improve the image analysis accuracy.

DESCRIPTION OF EMBODIMENTS

Embodiments of the present invention will be described below with reference to the attached drawings. However, this is illustrative only, and the technological scope of the present invention is not limited thereto.

Overview of System for Synthesizing a Panoramic Image 1

Figure 1:
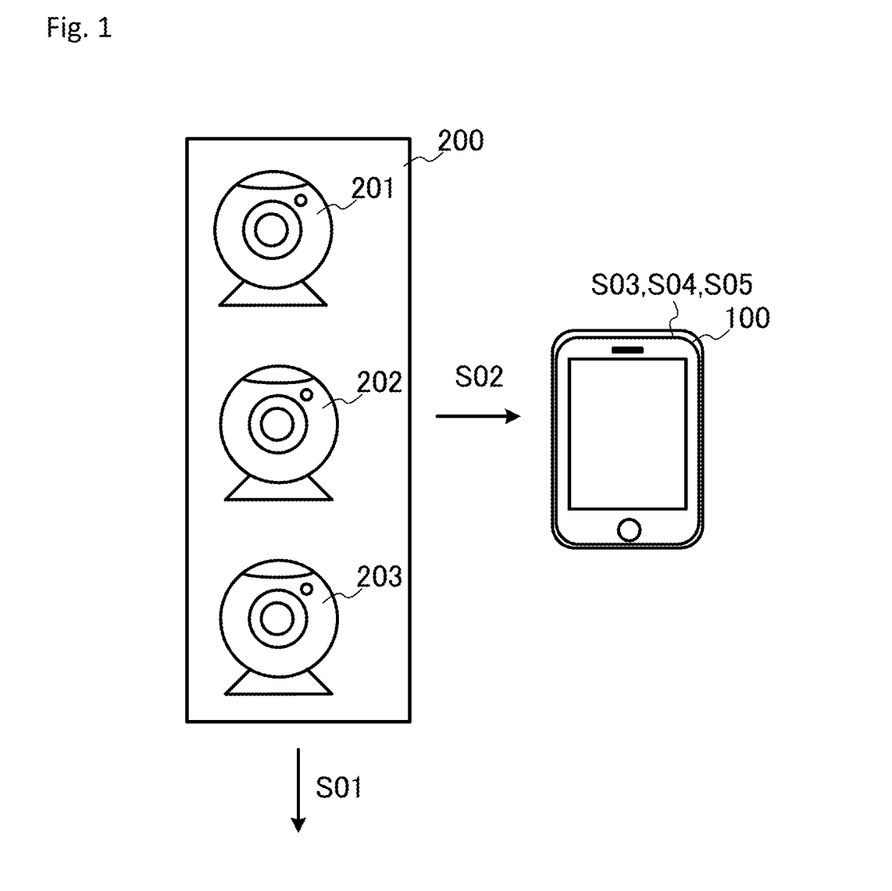
FIG. 1 shows a schematic diagram of the system for synthesizing a panoramic image 1.

The overview of the present invention will be described below with reference to FIG. 1. FIG. 1 shows an overview of the system for synthesizing a panoramic image 1 according to a preferable embodiment of the present invention. The system for synthesizing a panoramic image 1 includes a user terminal 100 and a camera 200. This camera 200 includes cameras 201, 202, and 203. The camera 200 is merely an expression of one group of the cameras 201, 202, 203 conveniently. The cameras 201, 202, 203 do not exist solely as one imaging device.

The number of the user terminals 100 is not be limited to one and may be two or more. Moreover, the number of the cameras 200 is not limited to three and may be three or more, or less. The user terminal 100 may be either an existing device or a virtual device, or the both. The process to be described later may be achieved by either or both of the user terminal 100 and the camera 200.

The user terminal 100 is capable of data communication with the camera 200, which is a terminal device owned by a user. Examples of the user terminal 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display. The user terminal 100 may be a terminal device or a virtual device such as cloud computing that the user does not own.

The camera 200 is an imaging device that is capable to take an image such as a moving or still image and of data communication with the user terminal 100. In the camera 200, the cameras 201, 202, 203 are aligned in a row at predetermined intervals. In the cameras 201, 202, 203 may be aligned in a circle at predetermined intervals or may be arranged in different ways. The taken image means an image such as a moving or still image taken by the camera 200.

First, the camera 200 takes an image (Step S01). The camera 200 takes an image by receiving image instruction from the user terminal 100 and operation input from the switch of the camera 200. The taken images vary depending on the cameras 201, 202, 203. Furthermore, the cameras 201, 202, 203 take an image at the same time.

The camera 200 transmits taken-image data that is the data on the taken image to the user terminal 100 (Step S02). The cameras 201, 202, 203 transmit data on the respective locations and a positional relationship among them together with a taken-image data to the user terminal 100.

The user terminal 100 receives the taken-image data. The user terminal 100 combines the two or more received taken-image data and produces a panoramic image (Step S03). The user terminal 100 may produce a panoramic image adjusted to the image that has the most pixels among the images taken by the camera 200. Alternatively, the user terminal 100 may produce a panoramic image adjusted to the image that has the least pixels among the images taken by the camera 200.

The user terminal 100 analyzes an object contained in the synthesized panoramic image (Step S04). The user terminal 100 may analyze an object on a seam in the synthesized panoramic image. In this case, if a part of the object on a seam is lacked, the user terminal 100 may supplement the lacked part to produce a panoramic image.

The user terminal 100 displays the result of the image analysis (Step S05). The user terminal 100 displays the panoramic image together with the result of the image analysis. The user terminal 100 may associate the result of the image analysis with the object contained in the panoramic image.

Configuration of System for Synthesizing a Panoramic Image 1

Figure 2:
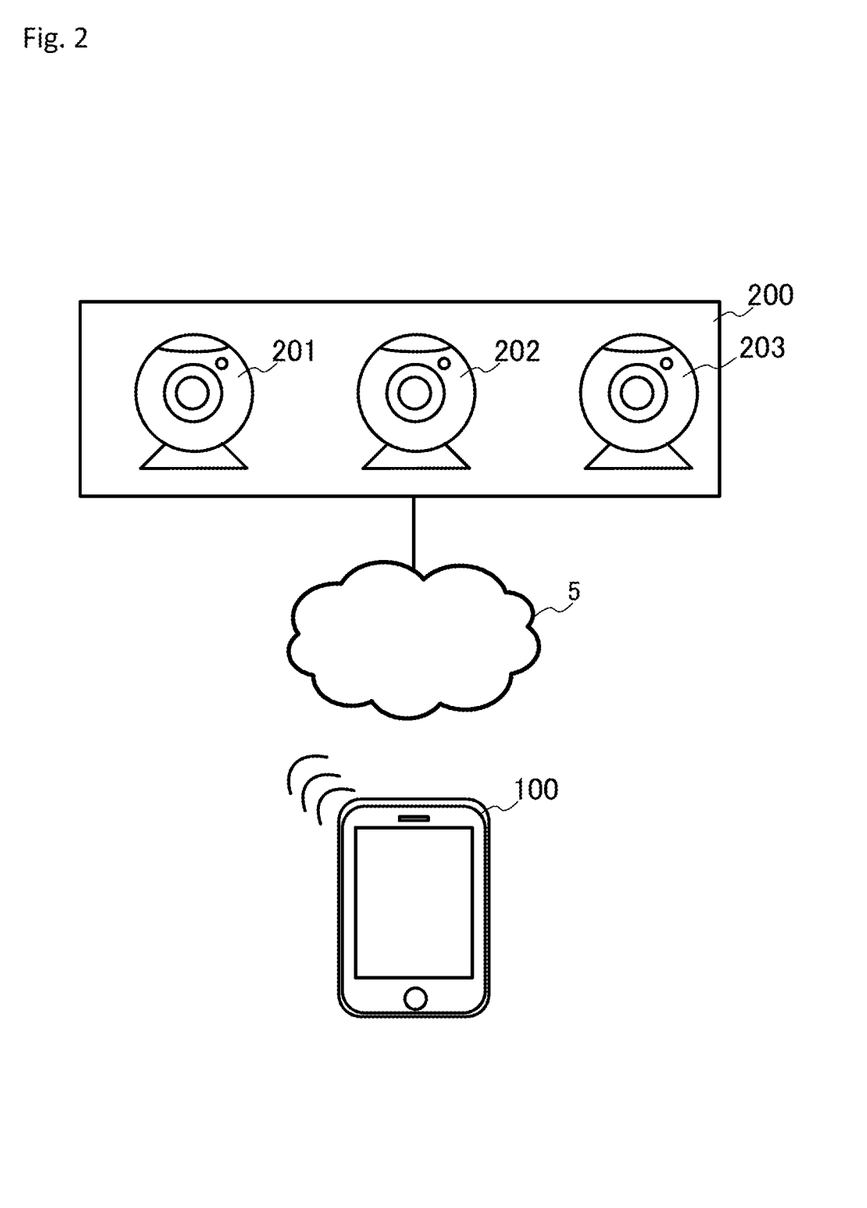
FIG. 2 shows an overall configuration diagram of the system for synthesizing a panoramic image 1.

The system configuration of the system for synthesizing a panoramic image 1 will be described with reference to FIG. 2. FIG. 2 shows a system configuration of the system for synthesizing a panoramic image 1 according to a preferable embodiment of the present invention. The system for synthesizing a panoramic image 1 includes a user terminal 100, a plurality of cameras 200 (cameras 201, 202, 203), a public line network 5 (e.g., the Internet network, or the third or fourth generation communication network). The number of the user terminals 100 is not be limited to one and may be two or more. Moreover, the number of the cameras 200 is not limited to three and may be three or more, or less. The user terminal 100 may be either an existing device or a virtual device, or the both. The process to be described later may be achieved by either or both of the user terminal 100 and the camera 200.

The user terminal 100 is the above-mentioned terminal device with the functions to be described later.

The camera 200 is the above-mentioned imaging device with the functions to be described later. The camera 200 collectively indicates a plurality of cameras 201, 202, 203. Since the configurations of the cameras 201, 202, 203 are the same as the camera 200, the cameras 201, 202, 203 will be described below as the camera 200.

Functions

Figure 3:
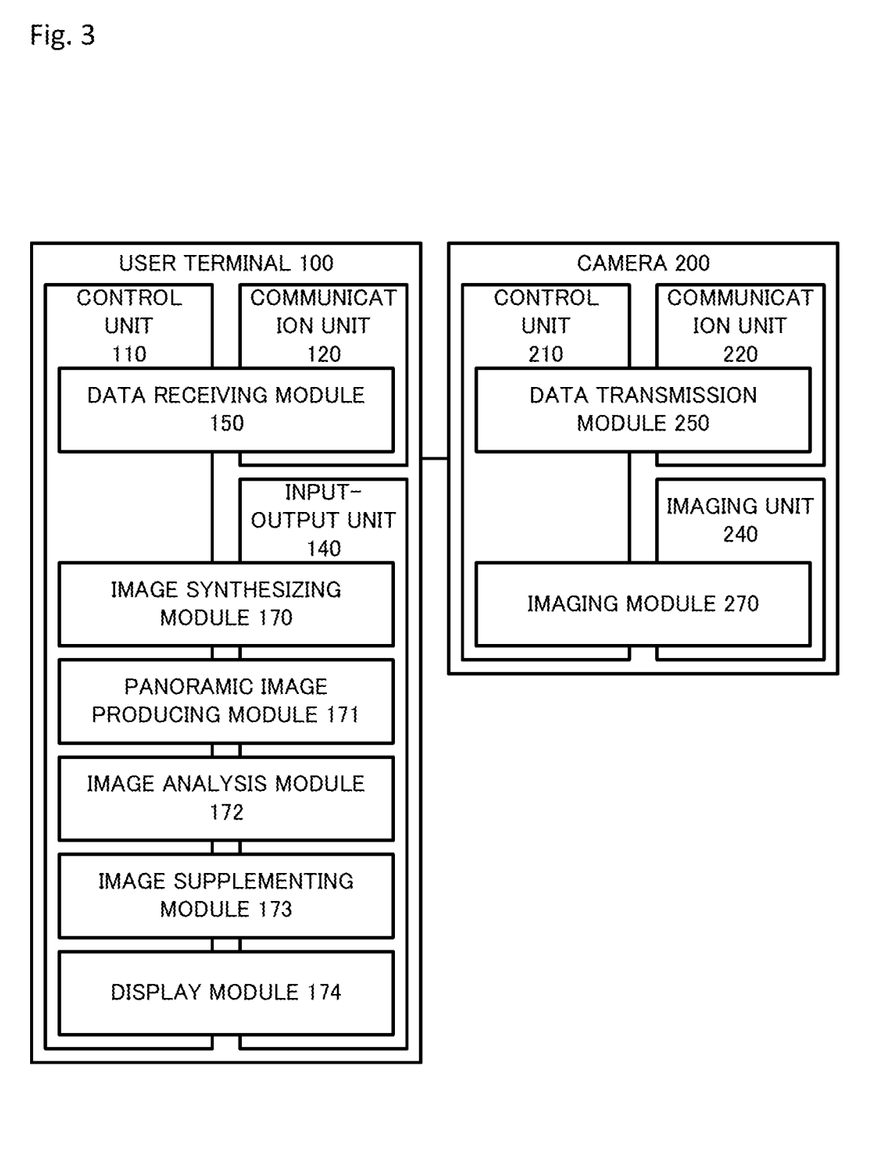
FIG. 3 shows a functional block diagram of the user terminal 100 and the camera 200.

The functions of the system for synthesizing a panoramic image 1 will be described with reference to FIG. 3. FIG. 3 shows a functional block diagram of the user terminal 100 and the camera 200.

The user terminal 100 includes a control unit 110 such as a central processing unit (hereinafter referred to as "CPU"), a random access memory (hereinafter referred to as "RAM"), and a read only memory (hereinafter referred to as "ROM") and a communication unit 120 such as a device that is capable to communicate with other devices, for example, a Wireless Fidelity or Wi-Fi® enabled device complying with IEEE 802.11 or a device that is capable of wired connection through USB, HDMI®, etc. The user terminal 100 also includes an input-output unit 140 including a display unit that outputs and displays data and images processed by the control unit 110 and an input unit such as a touch panel, a keyboard, or a mouse that receive an input from the user.

In the user terminal 100, the control unit 110 reads a predetermined program to achieve a data receiving module 150 in cooperation with the communication unit 120. Furthermore, in the user terminal 100, the control unit 110 reads a predetermined program to achieve an image synthesizing module 170, a panoramic image producing module 171, an image analysis module 172, an image supplementing module 173, and a display module 174 in cooperation with the input-output unit 140.

The camera 200 includes a control unit 210 including a CPU, a RAM, and a ROM; and a communication unit 220 such as a device that is capable to communicate with other devices, in the same way as the user terminal 100. The camera 200 also includes an imaging unit 240 including a lens, an imaging device, various buttons, and a flash.

In the camera 200, the control unit 210 reads a predetermined program to achieve a data transmission module 250 in cooperation with the communication unit 220. Furthermore, in the camera 200, the control unit 210 reads a predetermined program to run an imaging module 270 in cooperation with the imaging unit 240.

Panoramic Image Synthesis Analysis Process

Figure 4:
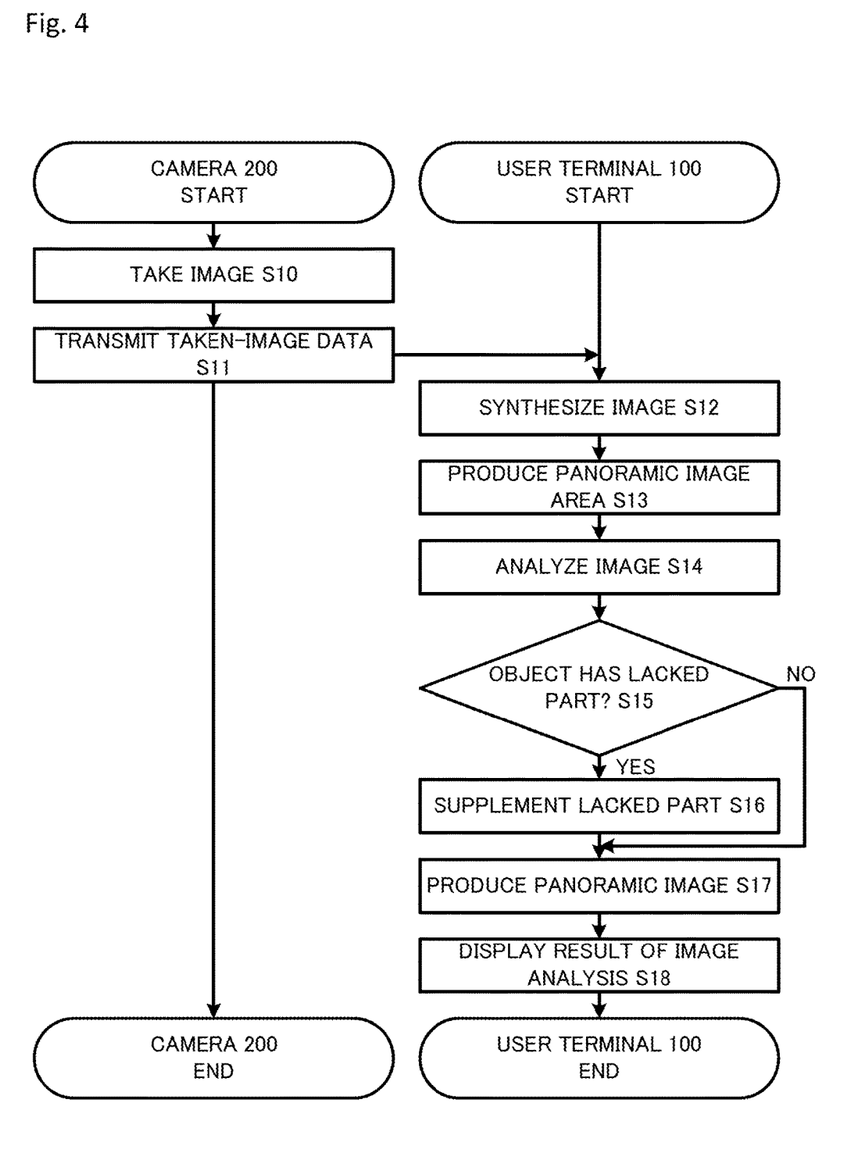
FIG. 4 shows a flow chart of the panoramic image synthesis analysis process performed by the user terminal 100 and the camera 200.

The panoramic image synthesis analysis process performed by the system for synthesizing a panoramic image 1 will be described with reference to FIG. 4. FIG. 4 shows a flow chart of the panoramic image synthesis analysis process performed by the user terminal 100 and the camera 200. The tasks executed by the modules of each of the above-mentioned units will be explained below together with this process.

Figure 5:
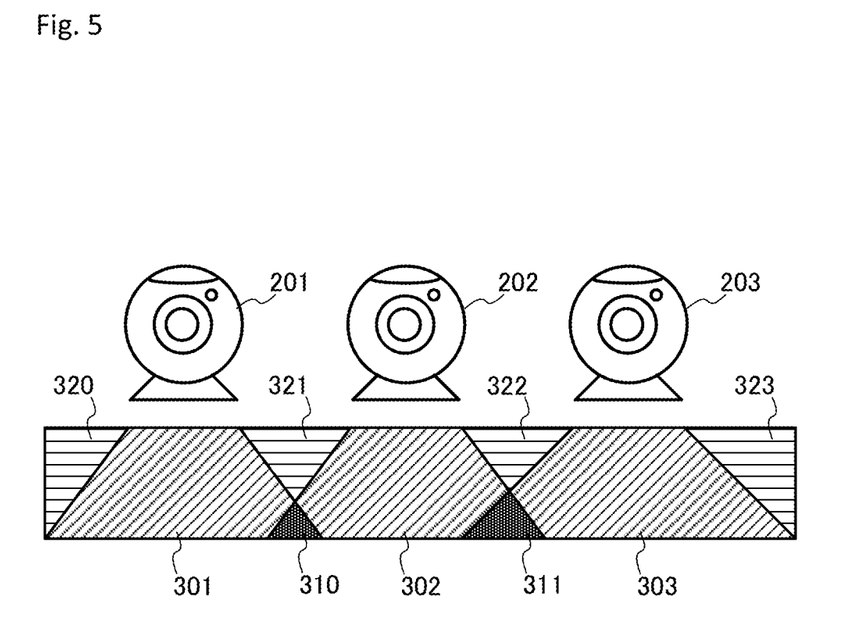
FIG. 5 shows one example of the arrangement of the cameras 201, 202, 203 included in the camera 200.

First, the camera 200 will be explained below with reference to FIG. 5. FIG. 5 shows one example of the arrangement of the cameras 201, 202, 203 included in the camera 200. FIG. 5 schematically shows the area that the cameras 201, 202, 203 images. The cameras 201, 202, 203 are aligned in a single horizontal row at predetermined intervals. The area imaged by the camera 201 is the imaging area 301. The area imaged by the camera 202 is the imaging area 302. The area imaged by the camera 203 is the imaging area 303. There is an overlap area 310 where the imaging area 301 of the camera 201 overlaps with the imaging area 302 of the camera 202. There is also an overlap area 311 where the imaging area 302 of the camera 202 overlaps with the imaging area 303 of the camera 203. There is also a non-imaging area 320 that the camera 201 cannot image. There is also a non-imaging area 321 between the camera 201 and the camera 202 that the both cannot image. There is also a non-imaging area 322 between the camera 202 and the camera 203 that the both cannot image. There is also a non-imaging area 323 that the camera 203 cannot image.

The locations, the shapes, etc., of the imaging areas 301-303, the non-imaging areas 320-323, and the overlap areas 310, 311 can be appropriately changed. Specifically, the non-imaging areas may be removed by increasing the number of the cameras. Alternatively, the non-imaging areas may be removed by adjusting the locations of the cameras. The overlap areas may be increased by increasing the number of the cameras. The overlap areas may be increased by adjusting the locations of the cameras.

The user terminal 100 produces a panoramic image by combining the images taken by the cameras 201, 202, 203 in the process to be described later. The user terminal 100 can improve the image analysis accuracy of an object that exists in the imaging areas 301, 302, 303 by analyzing this panoramic image more than by separately analyzing the individual images taken by the cameras 201, 202, 203. Moreover, the object that exists in the non-imaging areas 320, 321 is supplemented based on the analysis result of the panoramic image, so that the panoramic image supplemented with this object can be produced.

The imaging module 270 takes an image (Step S10). In the step S10, for example, the imaging module 270 takes an image by receiving imaging instruction from the user terminal 100 or input operation to the camera 200. In the step S10, the cameras 201-203 take an image of the above-mentioned imaging areas 301-303 shown in FIG. 5, respectively.

The data transmission module 250 transmits taken-image data that are the data on the image taken by the imaging module 270 to the user terminal 100 (Step S11). In the step S11, the data transmission module 250 adds arrangement data including location information and positional relationship pertaining to the cameras 201, 202, 203 to the taken-image data and transmits these data to the user terminal 100.

The data receiving module 150 receives the image data transmitted from the camera 200. This means that the data receiving module 150 receives the image data from the cameras 201 to 203. The image synthesizing module 170 synthesizes one image based on the received image data and the arrangement data (Step S12).

Figure 6:
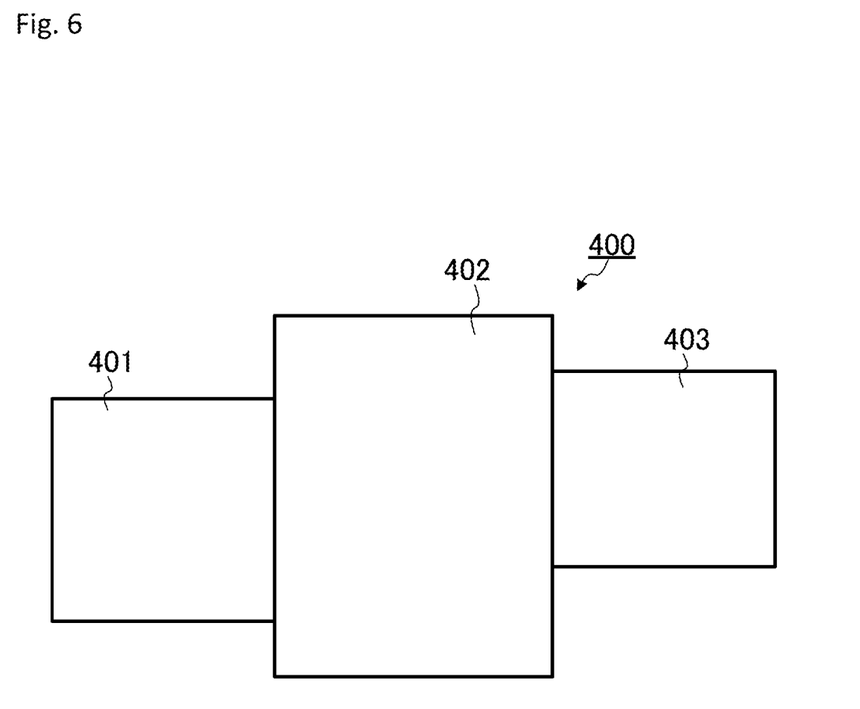
FIG. 6 shows one example of one image synthesized by the user terminal 100.

FIG. 6 shows one example of one image synthesized by the image synthesizing module 170. In FIG. 6, the image synthesizing module 170 synthesizes one image 400 based on the arrangement data on the cameras 201-203 and the image data taken by the cameras 201-203. The image synthesizing module 170 aligns the image 401 taken by the camera 201, the image 402 taken by the camera 202, and the image 403 taken by the camera 203 in a single horizontal row based on the arrangement of the cameras 201-203 to synthesize one image 400. The image synthesizing module 170 determines and synthesizes the seam in the images 401 and 402 based on the image of the above-mentioned overlap area 310. The image synthesizing module 170 determines and synthesizes the seam in the images 402 and 403 based on the image of the above-mentioned overlap area 311.

The panoramic image producing module 171 produces a panoramic image area based on the one synthesized image (Step S13).

Figure 7:
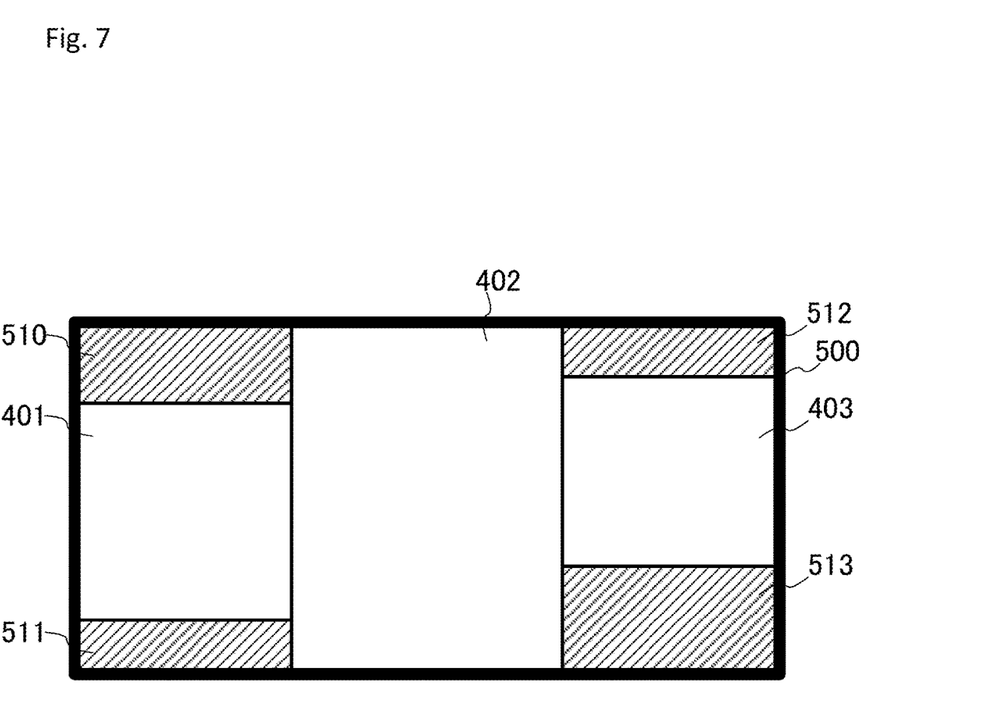
FIG. 7 shows one example of a panoramic image area produced by the user terminal 100.
Figure 8:
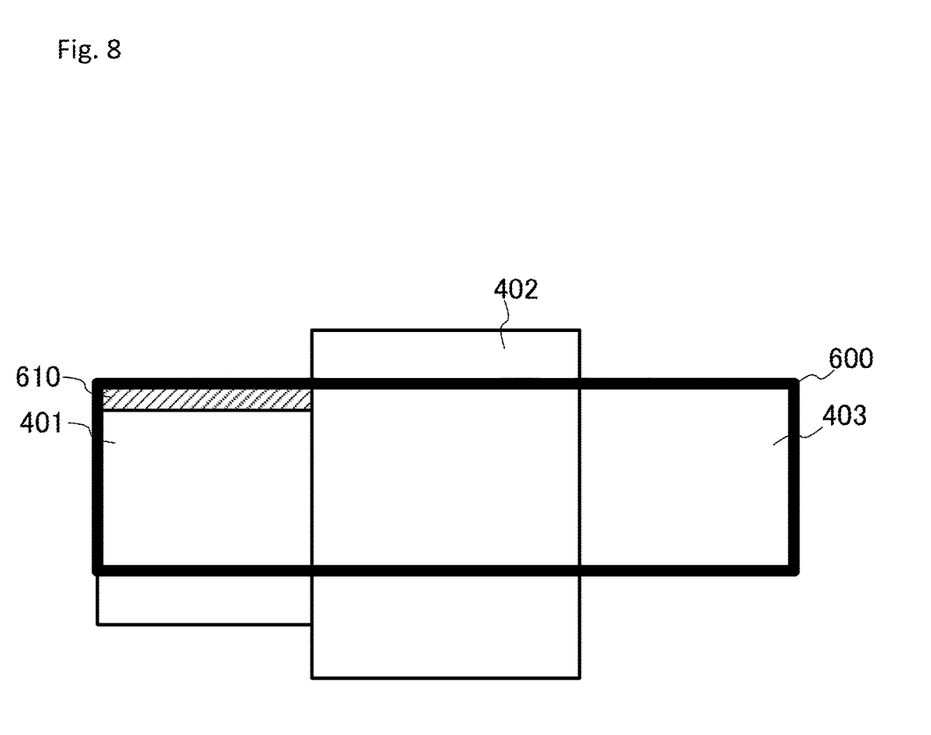
FIG. 8 shows one example of a panoramic image area produced by the user terminal 100.

FIG. 7 shows one example of an image area produced by the panoramic image producing module 171. In FIG. 7, the panoramic image producing module 171 produces the panoramic image area 500 enclosed by a heavy line, adjusting to the image 402 with the most pixels. In FIG. 7, the panoramic image producing module 171 produces a panoramic image area 500 containing all the images 401, 402, and 403 based on the image 402 with the most pixels. At this point, the panoramic image area 500 has blank areas 510-513 corresponding to the above-mentioned non-imaging areas 320-323, respectively, FIG. 8 shows one example of an image area produced by the panoramic image producing module 171. In FIG. 8, the panoramic image producing module 171 produces the panoramic image area 600 enclosed by a heavy line, adjusting to the image 403 with the least pixels. In FIG. 8, the panoramic image producing module 171 produces a panoramic image area 600 containing a part of the image 401, a part of the image 402, and the whole image 403 based on the image 403 with the least pixels. At this point, the panoramic image area 600 has a blank area 610 corresponding to the above-mentioned non-imaging area 321.

The image analysis module 172 analyzes an object contained in the synthesized panoramic image area (Step S14). In the step S14, the image analysis module 172 analyzes an object on the seams in the synthesized panoramic image area. For example, the seams in the images contained in the synthesized panoramic image area means the boundaries between the image 401 and the image 402 and between the image 402 and the image 403 in FIG. 7 or 8 In the step S14, the image analysis module 172 extracts the feature amount of each object and compares this extracted feature amount and that stored in an external computer or the user terminal 100 to identify the object. The image analysis module 172 acquires the name and the various kinds of information of the identified object based on the database, etc., stored in an external computer or the user terminal 100. For example, if the object is a vehicle, the image analysis module 172 acquires information including the name, the model, and the manufacturer of this vehicle. If the object is a person, the image analysis module 172 acquires information including the name, the age, the occupation, the address, the phone number, and the mail address of this person. Even if the object is something else, the image analysis module 172 are acquires various kinds of information.

The image analysis module 172 judges whether or not there is a part lacked from the identified object. (Step S15). In the step S15, the image analysis module 172 judges whether or not there is a part lacked from the identified object based on whether or not a part of the identified object does not exist in the panoramic image area.

If the image analysis module 172 judges that there is a part lacked from the identified object (YES) in the step S15, the image supplementing module 173 supplements the lacked part (Step S16). In the step S16, for example, the image supplementing module 173 acquires the image of the identified object from the database, etc., stored in an external computer and the user terminal 100 and supplements the corresponding part in the acquired image to the lacked part.

The image supplementing module 173 may supplement the lacked part by repeating the lacked part and the non-lacked part alternatively. For example, if the image analysis module 172 identifies the wall as an object and judges that this wall has a lacked part, the image supplementing module 173 may repeat the feature such as the pattern or the decoration that exists in the part not lacked from this wall in the lacked part to supplement the lacked part. Moreover, the image supplementing module 173 may supplement the lacked part in a way other than that described above.

After the step S16, the user terminal 100 performs the step S17 to be described later.

If the image analysis module 172 judges that there is not a part lacked from the identified object (NO) in the step S15, the panoramic image producing module 171 produces the panoramic image (Step S17).

Figure 9:
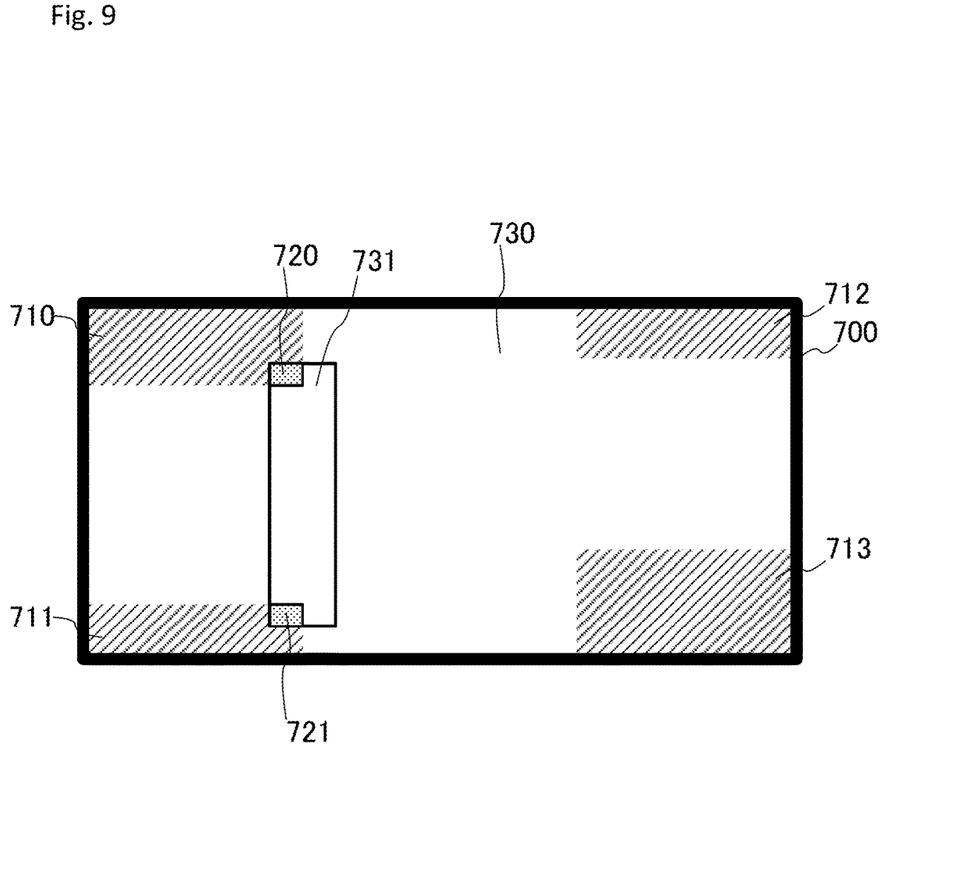
FIG. 9 shows one example of a panoramic image produced by the user terminal 100.

FIG. 9 shows one example of a panoramic image produced by the panoramic image producing module 171 in which the image supplementing module 173 supplemented a part of the panoramic image area 500 shown in FIG. 7. In FIG. 9, the panoramic image 700 has a synthetic image 730 and blank-supplemented areas 710-713. The synthetic image 730 contains an object 731. The object 731 is, for example, an article such as a vehicle or a sign, a person, or a nature. The synthetic image 730 is an image in which the images 401-403 shown in FIG. 7 are combined. The blank-supplemented areas 710-713 are areas to which the image supplementing module 173 supplemented the blank areas 510-513 shown in FIG. 7 in the step S16. Since the object 731 has a lacked part existing in the blank areas 510, 511, there are object-supplemented areas 720, 721 to which the image supplementing module 173 supplemented a part of this object 731. The blank-supplemented areas 710-713 and the object-supplemented areas 720, 721 are supplemented in the above-mentioned step S16.

Figure 10:
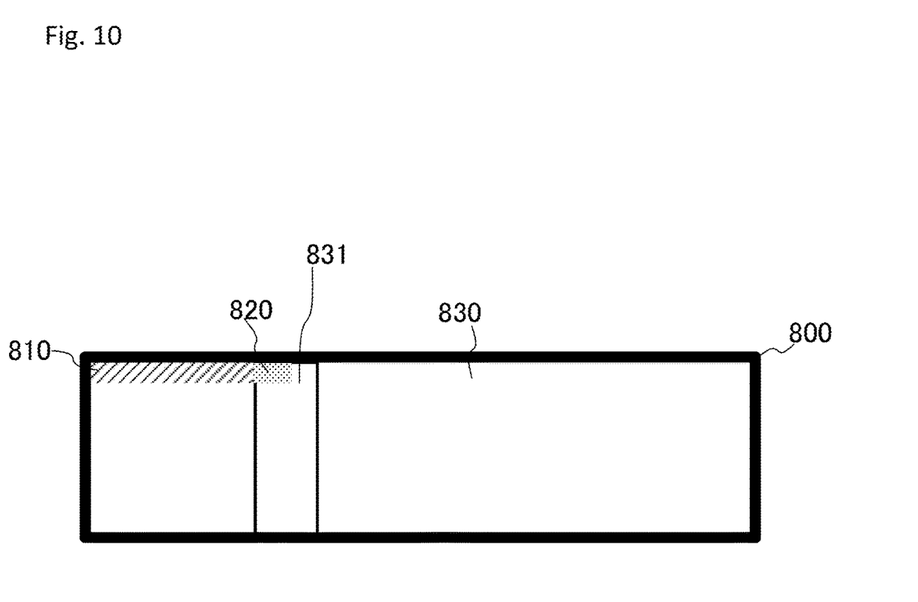
FIG. 10 shows one example of a panoramic image produced by the user terminal 100.

FIG. 10 shows one example of a panoramic image produced by the panoramic image producing module 171 in which the image supplementing module 173 supplemented a part of the panoramic image area 700 shown in FIG. 8. In FIG. 10, the panoramic image 800 has a synthetic image 830 and a blank-supplemented area 810. The synthetic image 830 contains an object 831. The object 831 is, for example, an article such as a vehicle or a sign, a person, or a nature. The synthetic image 830 is an image in which the images 401-403 shown in FIG. 8 are combined. The blank-supplemented area 810 is an area to which the image supplementing module 173 supplemented the blank area 610 shown in FIG. 8 in the step S16. Since the object 831 has a lacked part existing in the blank area 610, there is an object-supplemented area 820 to which the image supplementing module 173 supplemented a part of this object 831. The blank-supplemented area 810 and the object-supplemented area 820 are supplemented in the above-mentioned step S16.

Thus, the user terminal 100 can produce an object not contained in a panoramic image by presuming and supplementing an object existing in a blank area.

The display module 174 displays the result of the image analysis (Step S18). In the step S18, the display module 174 displays the result of the image analysis on the produced panoramic image. At this time, the display module 174 associates and displays the result of the image analysis with an object contained in the produced panoramic image. For example, in the step S18, if the object is a vehicle, the display module 174 associates and displays information including the name, the model, and the owner name of this vehicle. If the object is a person, the display module 174 associates and displays information including the name, the age, the occupation, the address, the phone number, and the mail address of this person. If the object is something else, the display module 174 associates and displays various kinds of information in the same way.

Figure 11:
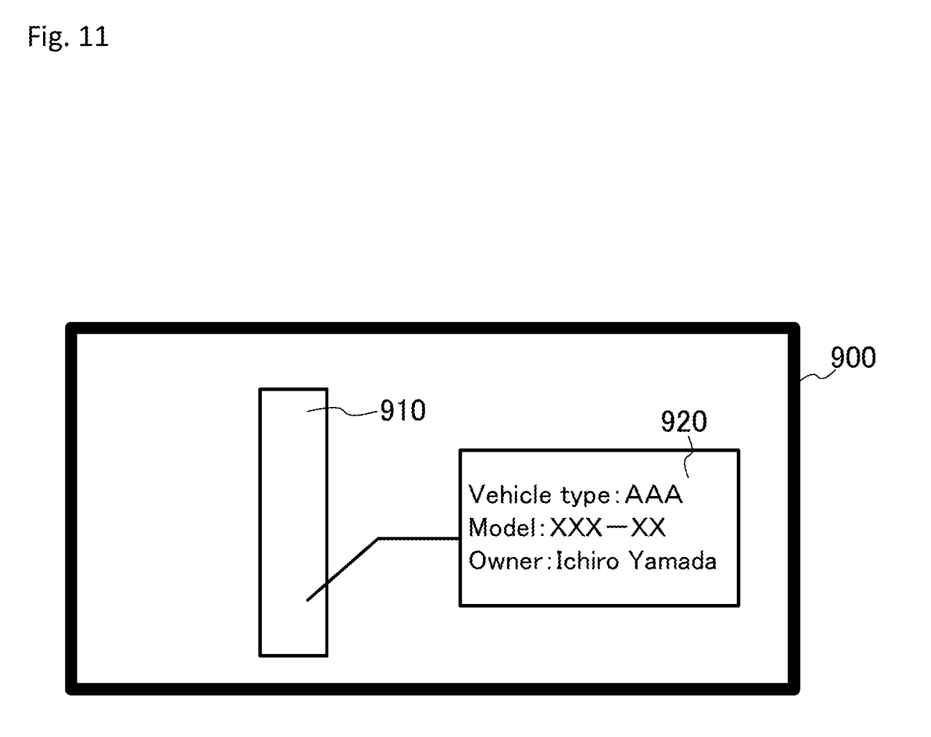
FIG. 11 shows one example of a panoramic image displayed by the user terminal 100.

FIG. 11 shows one example of a panoramic image displayed by the display module 174. From FIG. 11, the display module 174 displays a car 910 as an object in a panoramic image 900. In FIG. 11, objects other than the car 910 that the display module 174 displays are omitted. FIG. 11 schematically shows the car 910 for the sake of shorthand. In FIG. 11, the display module 174 superimposes and displays an information display area 920 associated with this car 910 on the panoramic image 900. This information display area 920 is connected with the car 910 through a lead line to show which object is associated with. The display module 174 displays the result of the image analysis performed in the above-mentioned step S14 in the information display area 920. In FIG. 11, the display module 174 displays the vehicle type, the model, and the owner in the information display area 920.

The display module 174 may not superimpose an information display area 920 on a panoramic image but may display an information display area 920 around a panoramic image or other places. To specify the association, for example, a sign may be provided to an object, and also the same sign or the corresponding sign may be provided to the information display area 920.

Moreover, the display module 174 may display the result of the image analysis about the object for which input operation is input from the user. In this case, for example, the display module 174 receives input operation for any one of the objects and displays the result of the image analysis about this object.

The system for synthesizing a panoramic image 1 can improve the image analysis accuracy by analyzing a panoramic image synthesized from images taken by two or more cameras 200 through the above-mentioned process even if there is an image taken by one camera 200 that does not contain a whole object. Furthermore, the system is capable to supplement and display a part that is not contained in an image based on the result of the image analysis.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for synthesizing a panoramic image
100 User terminal
200 Camera

What is claimed is:

1. A system for synthesizing a panoramic image, comprising:
a processor that:
combines images taken by a plurality of cameras and produces a panoramic image;
analyzes an object contained in the synthesized panoramic image; and
displays the result of the image analysis on a display device,
wherein the processor produces the panoramic image adjusted to the image that has the most pixels among the images taken by the plurality of cameras.

2. The system according to claim 1, wherein the processor analyzes an object contained in a seam in the synthesized panoramic image.

3. The system according to claim 1, wherein the processor associates and displays the result of the image analysis with the object.

4. The system according to claim 1, wherein the processor supplements and displays a part lacked from the object based on the result of the image analysis.

5. A system for synthesizing a panoramic image, comprising:
a processor that:
combines images taken by a plurality of cameras and produces a panoramic image;
analyzes an object contained in the synthesized panoramic image; and
displays the result of the image analysis on a display device,
wherein the processor produces a panoramic image adjusted to the image that has the least pixels among the images taken by the plurality of cameras.

6. A method for synthesizing a panoramic image, comprising the steps of:
combining images taken by a plurality of cameras and producing a panoramic image;
analyzing an object contained in the synthesized panoramic image; and
displaying the result of the image analysis,
wherein producing a panoramic image includes producing the panoramic image adjusted to the image that has the most pixels among the images taken by the plurality of cameras.

7. A computer program product for use in a system for synthesizing a panoramic image, comprising a non-transitory computer usable medium having a set of instructions physically embodied therein, the set of instructions including computer readable program code, which when executed by the system causes an information processing unit to:
combining combine images taken by a plurality of cameras and produce a panoramic image;
analyzing analyze an object contained in the synthesized panoramic image; and
displaying display the result of the image analysis,
wherein producing a panoramic image includes producing the panoramic image adjusted to the image that has the most pixels among the images taken by the plurality of cameras.

* * * * *